United States Patent
Buch et al.

(10) Patent No.: US 9,549,061 B2
(45) Date of Patent: Jan. 17, 2017

(54) CALL CENTER BASED ZONED MICROPHONE CONTROL IN A VEHICLE

(75) Inventors: Gary M. Buch, Washington, MI (US); Jesse T. Gratke, Royal Oak, MI (US); Nathan D. Ampunan, Novi, MI (US); Douglas C. Martin, Oxford, MI (US); Bassam S. Shahmurad, Clinton Township, MI (US)

(73) Assignee: General Motors LLC, Detroit, MI (US)

( * ) Notice: Subject to any disclaimer, the term of this patent is extended or adjusted under 35 U.S.C. 154(b) by 155 days.

(21) Appl. No.: 13/517,828

(22) Filed: Jun. 14, 2012

(65) Prior Publication Data

US 2013/0337762 A1 Dec. 19, 2013

(51) Int. Cl.
| | |
|---|---|
| G08C 19/00 | (2006.01) |
| G08B 1/08 | (2006.01) |
| H04W 24/00 | (2009.01) |
| G08G 1/123 | (2006.01) |
| H04M 3/42 | (2006.01) |
| G08G 1/00 | (2006.01) |
| H04W 4/22 | (2009.01) |
| H04W 4/04 | (2009.01) |

(52) U.S. Cl.
CPC ............... *H04M 3/42* (2013.01); *G08G 1/205* (2013.01); *H04W 4/046* (2013.01); *H04W 4/22* (2013.01)

(58) Field of Classification Search
CPC .......... H04Q 7/20; G08C 19/00; G08F 21/00; H04M 11/00; H04B 1/00
USPC .... 340/12.25, 71.2, 539.1, 539.11, 988, 990, 340/995.1; 455/466, 518, 557, 456; 726/26; 381/71.2
See application file for complete search history.

(56) References Cited

U.S. PATENT DOCUMENTS

| | | | |
|---|---|---|---|
| 6,748,211 B1* | 6/2004 | Isaac ....................... | H04W 4/14 455/412.2 |
| 6,946,977 B2* | 9/2005 | Chen .................... | G08B 25/016 340/426.15 |
| 6,983,171 B2* | 1/2006 | Van Bosch et al. .......... | 455/557 |
| 7,663,502 B2* | 2/2010 | Breed ........................ | 340/12.25 |
| 8,018,332 B2* | 9/2011 | Boling .................. | B60R 25/102 340/539.1 |
| 8,121,628 B2* | 2/2012 | Mauti, Jr. ..................... | 455/466 |
| 2002/0098850 A1* | 7/2002 | Akhteruzzaman et al. .. | 455/456 |
| 2005/0221852 A1* | 10/2005 | D'Avello et al. ............. | 455/518 |
| 2008/0031468 A1* | 2/2008 | Christoph .......... | G10K 11/1788 381/71.2 |
| 2008/0148409 A1* | 6/2008 | Ampunan et al. .............. | 726/26 |

FOREIGN PATENT DOCUMENTS

CN 1938960 A 3/2007

\* cited by examiner

*Primary Examiner* — Nam V Nguyen
(74) *Attorney, Agent, or Firm* — Christopher DeVries; Reising Ethington P.C.

(57) ABSTRACT

A method and system for providing call center emergency services to one or more occupants of a vehicle having a plurality of listening zones within a passenger compartment of the vehicle. The method involves detecting a potential emergency condition, sending an emergency notification to a call center, receiving a listening zone control signal identifying at least one of a plurality of listening zones in the vehicle, and supplying audio received from the identified listening zones(s) to the call center via a voice call between the vehicle and call center.

14 Claims, 4 Drawing Sheets

CALL CENTER BASED ZONED MICROPHONE CONTROL IN A VEHICLE

TECHNICAL FIELD

This invention relates to vehicle audio user interfaces that utilize a microphone system to permit speech communication with individuals located in a passenger compartment of a vehicle.

BACKGROUND

Vehicles commonly come equipped with user interfaces that provide not only manual inputs (e.g., pushbutton switches) and visual and audio output, but that increasingly use speech-based inputs from a driver or other occupant to provide vehicle services. These services may include those carried out exclusively at and by the vehicle, or those which utilize a telematics service provider via a wireless telematics capability of the vehicle or via a personal mobile device such as a cellular phone carried by the driver or other occupant.

Telematics service providers are able to provide vehicle occupants with emergency and other assistance via a call center operation that typically includes a live advisor who carries out voice conversations with the vehicle occupant(s). In the vehicle, occupant speech is picked up within the passenger compartment via a microphone system that may include one or more microphones configured to received audio from one or more listening zones within the vehicle.

SUMMARY

According to an embodiment of the invention, there is provided a method for providing call center emergency services to one or more occupants of a vehicle having a plurality of listening zones within a passenger compartment of the vehicle, comprising the steps of: (a) receiving a communication at a call center from a vehicle indicating emergency services may be needed by one or more occupants of the vehicle; (b) sending a listening zone control signal to the vehicle; and (c) monitoring at the call center for audio received over a voice call from at least one microphone in the vehicle that is configured to pickup sound from a passenger compartment listening zone identified by the control signal.

According to another embodiment of the invention, there is provided a method for providing call center emergency services to one or more occupants of a vehicle having a plurality of listening zones within a passenger compartment of the vehicle, comprising the steps of: (a) detecting a potential emergency condition; (b) sending an emergency notification to a call center; (c) receiving a listening zone control signal identifying at least one of a plurality of listening zones in the vehicle; and (d) supplying audio received from the identified listening zone(s) to the call center via a voice call between the vehicle and call center.

According to another embodiment of the invention, there is provided a vehicle having vehicle electronics that includes a plurality of vehicle system modules each having a processor and computer readable memory that contains instructions such that the modules together operate in response to execution of the instructions by the processors to carry out the following steps: (a) detecting a vehicle collision using a crash detection module; (b) sending a crash notification to a call center via a telematics unit in response to step (a); (c) receiving via the telematics unit a listening zone control signal identifying at least one of a plurality of listening zones in the vehicle; and (d) supplying audio received from the identified listening zone(s) to the call center via a voice call between the telematics unit and call center.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and methods described below are directed to different embodiments for providing call center services to one or more occupants of a vehicle having a plurality of listening zones within the vehicle that may be selectively activated and disabled remotely by an advisor at a call center. This may be helpful, for example, in case of a vehicle collision or other emergency where the advisor may seek to determine the number of occupants and their condition. Such information may then be communicated to an emergency dispatcher or first responders prior to arriving on scene. This may also be helpful in assisting the advisor in providing instructions or reassurance to the vehicle occupant(s).

As will be described farther below, the listening zones may be implemented using a microphone system that includes one or more individual microphones that provide zoned or directional sensitivity to help isolate the incoming audio to an individual zone or zones within the passenger compartment of the vehicle. Single microphones that may be electronically switched between omnidirectional and unidirectional sensing patterns or between different directional sensing patterns are known. Alternatively, microphone systems involving multiple microphones distributed around the vehicle interior compartment are also known; such microphones may be located in the instrument panel, rearview mirror, or front edge of the headliner for front seat passengers, and in the side doors or seat backs for passengers in a second or third row. However arranged, the microphone system is implemented as a vehicle user interface that is in communication with a telematics unit on the vehicle or other available wireless telematics unit (such as a personal mobile phone carried by an occupant) so that audio picked up by the microphone system may be transmitted from the vehicle to the advisor. The microphone system further includes the ability to activate and deactivate one or more of the different listening zones based on a control signal received from the advisor.

Communications System—

Figure 1:
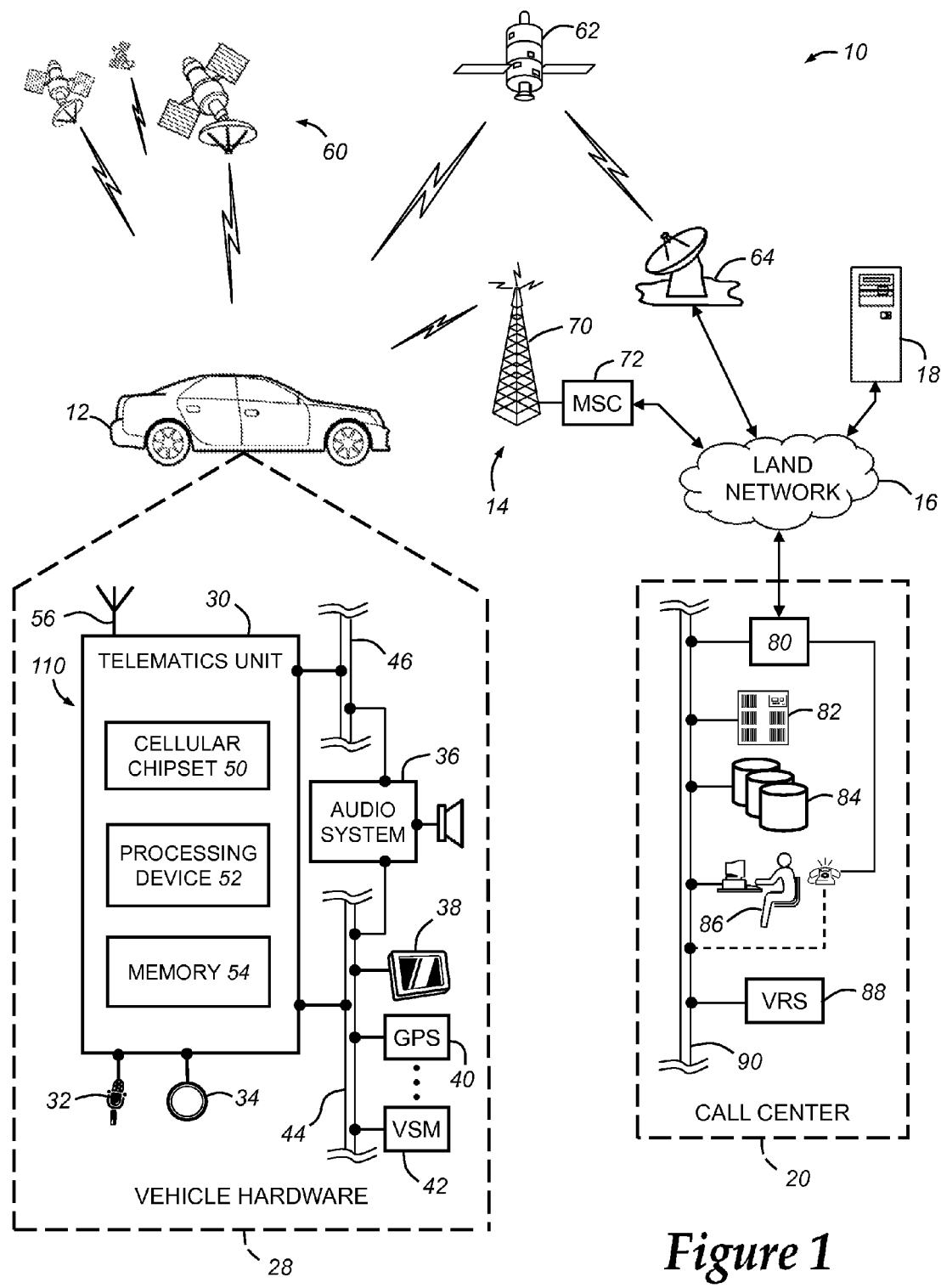
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Microphone System—

In the embodiment of FIG. 1, speech from the driver or other occupant to the advisor at the call center is picked up by microphone 32. In a typical passenger vehicle layout, there may be defined different listening zones which may correspond to specific seat locations or to larger areas such as the front row of seats (as one zone) versus a second row of seats (as a second zone). Where a single microphone is utilized as shown in FIG. 1, a selectively adjustable microphone may be used that provides different pickup patterns corresponding to the two or more listening zones. Such directionality control of a microphone is known; see, for example, US Patent Application Publication No. 2008/0118080 A1, published May 22, 2008, the entire contents of which are hereby incorporated by reference. Microphone 32 may comprise a part of a microphone system 110 which, in FIG. 1, is implemented using the hardware and suitable software programming of the telematics unit 30. Thus, the audio picked up by the microphone may be sent over a voice connection established between the telematics unit and wireless carrier system 14, and remote control of the microphone from the advisor 86 may be carried out using listening zone control signals sent via data communication to the telematics unit 30 from the call center through the wireless carrier system 14. The programming needed to respond to the listening zone control signal and alter the microphone's pickup pattern may be stored in memory 54 and executed via processor 52. In other embodiments, a different electronics module may be used (e.g., a dedicated microphone system module or one that shares other vehicle functions).

Figure 2:
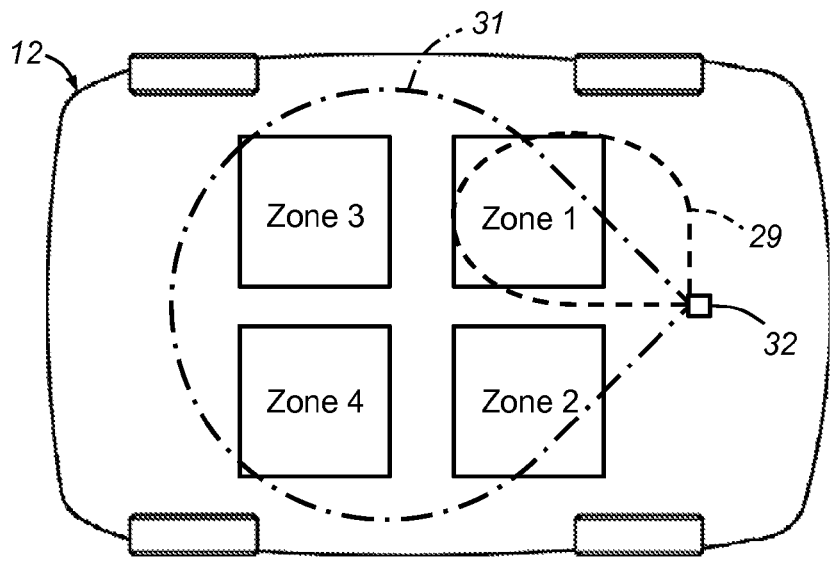
FIG. 2 is a diagrammatic view of different zones and microphone pickup patterns that may be used in the vehicle of FIG. 1.

An example of the use of a configurable pickup pattern microphone 32 is shown in FIG. 2 wherein a passenger compartment of vehicle 12 having four listening zones 1-4 includes microphone 32 normally configured for speech pickup primarily from the driver at zone 1, as indicated by microphone pickup pattern 29. This pickup pattern 29 may be most suitable under normal driving conditions where speech input from the driver is desired, either for speech recognition purposes, such as to control vehicle operations or to access vehicle services, or for voice communication with an advisor. Apart from this normal pickup pattern 29, microphone 32 is configurable by a listening zone command sent from the call center 20 to switch to a whole compartment pickup pattern 31 that enables microphone 32 to more readily detect audio from most anywhere in the passenger compartment (e.g., from any occupant position corresponding to zones 1-4). In other embodiments, the microphone may be configurable to cover two or more zones individually, thereby allowing the advisor to separately access audio from each of the two or more zones.

Figure 3:
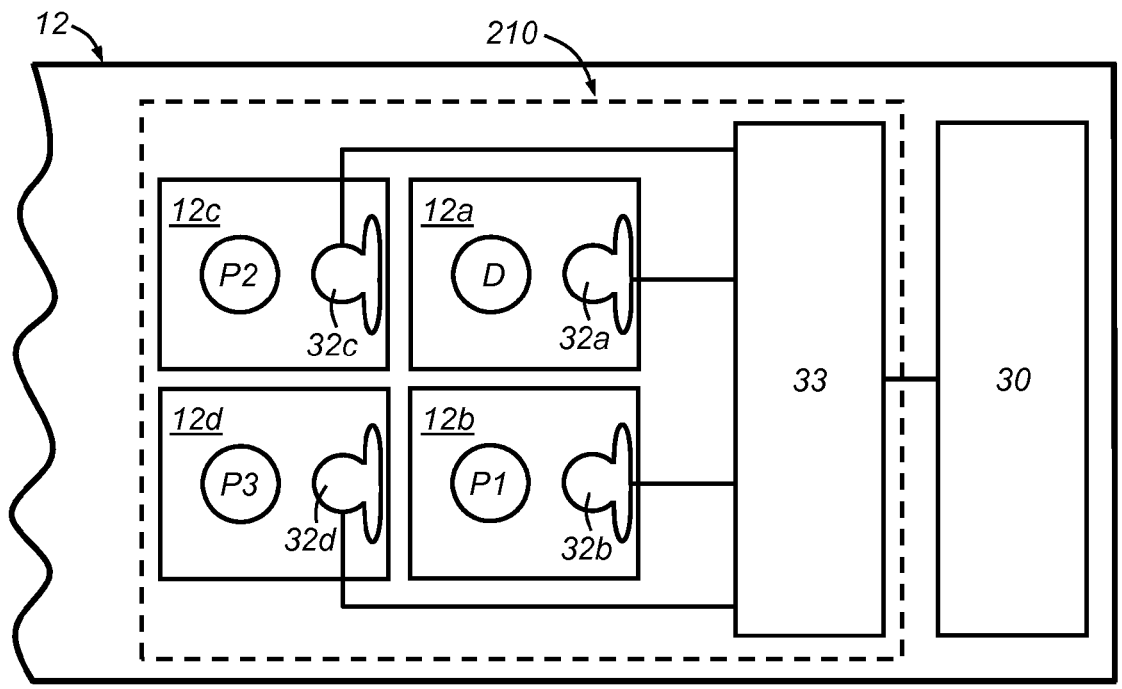
FIG. 3 is a block diagram depicting an embodiment of a microphone system that can be used with the system of FIG. 1.

Turning now to FIG. 3, there is shown another embodiment of a microphone system 210 that may be used in the FIG. 1 embodiment in lieu of the microphone system 110 and that utilizes a dedicated microphone controller 33 that functions as a multiplexor and/or audio mixer to selectively connect one or more of a plurality of different microphones at different listening zones through to an audio input to telematics unit 30 that is then sent to the advisor. The passenger compartment may include a first zone 12a for a driver D, a second zone 12b for a first passenger P1, a third zone 12c for a second passenger P2, and a fourth zone 12d for a third passenger P3. In some embodiments, the listening zones may correspond to vehicle occupant zones such as seat positions; in other embodiments the listening zones may be more restricted (e.g., a certain portion of an occupant seating position) or more general (as in a passenger seating row that includes multiple seats).

Microphone system 210 includes a plurality of microphones 32a, 32b, 32c, and 32d which can be used to receive vehicle occupant speech and convert the speech into electrical audio signals. In another example, one or more active noise control microphones may be used to receive user speech and/or vehicle noise for conversion into user speech signals and/or vehicle noise signals, respectively. In this way, noise may be filtered out to improve the quality and recognizability of the speech transmitted from the vehicle. In any case, the plurality of microphones 32a-32d correspond to the plurality of respective zones 12a-12d in the vehicle 12. The microphone system 210 includes the controller 33 which is in communication with the microphones (e.g., by being hardwired to the microphones) to receive and process the signals sent from microphones 32a-32d. The system 210 also may include one or more amplifiers to amplify the signals from corresponding microphones, and one or more analog to digital converters to convert the amplified signals from analog form into digital form.

The one or more microphones 32a-32d may include any suitable type(s) of microphones. The microphones 32a-32d may be positioned in front of the respective vehicle occupants (driver and passengers) at the different listening zones. In one example, the front microphones 32a, 32b may be carried in a headliner console, on sun visors, rearview mirror, or A-pillars of the vehicle 12, above and in front of the first and second zones 12a, 12b, respectively. In another example, the rear microphones 32c, 32d may be positioned on a rear portion of driver and passenger seats, respectively, or on respective B-pillars of the vehicle 12, in the headliner, in adjacent vehicle doors, or in any other suitable location corresponding to the third and fourth zones 12c, 12d. The microphones 32a-32d can have a frequency response suitable for speech, for instance, from 300 Hz to 8 kHz. For example, the microphones can include conventional 0-8 kHz microphones or newer wideband 0-11 kHz microphones. Each of the microphones 32a-32d can include an individual directional or omnidirectional microphone, dual microphones, and/or the like.

The microphone system 210 may include, in addition to microphones 32a-32d, active noise control (ANC) microphones including omnidirectional microphones or any other suitable ANC microphones. The ANC microphones may be combined with microphones 32a-32d in the same enclosure or located separately. In one example, the ANC microphones can be positioned laterally outboard of the speech microphones 32a-32d. In another example, the ANC microphones can be positioned laterally outboard of and/or above the occupant seats. For instance, the ANC microphones can be carried by any suitable portion of a headliner of the vehicle 12, wherein the ANC microphones can be positioned to be above the ears of most vehicle occupants. As used herein, the terminology "ANC microphones" includes microphones having omnidirectional and phase correlated characteristics. The microphones should be in phase with one another so that anti-noise signals can be produced to be exactly 180° out of phase with the noise. The ANC microphones can be tuned to sense low frequency vehicle noise, for example, by being tuned for sensitivity from 0-200 Hz. The construction and use of such ANC microphones is known to those skilled in the art.

In some embodiments, the microphones 32a-32d are always active; that is, always operating to provide audio signals to controller 33, with the controller 33 then operating to select among the different audio inputs coming from the microphones based on one or more listening zone control signals that are received from the call center via telematics unit 30. In such an embodiment, the controller 33 receives vehicle occupant speech signals from the plurality of microphones, and either selects among them to pass through to the telematics unit, or mixes the audio from two or more zones, based either one a specific listening zone control signal originated at the call center, or by an automated selection process carried out at the vehicle using on-board programming. The received audio from the different microphones may also be used during regular vehicle operation to determine occupancy of the vehicle, such as by monitoring each zone for speech originating from that zone. This may be used to replace or supplement other occupant detection systems, such as those using switches/sensors mounted in the seat.

Figure 4:
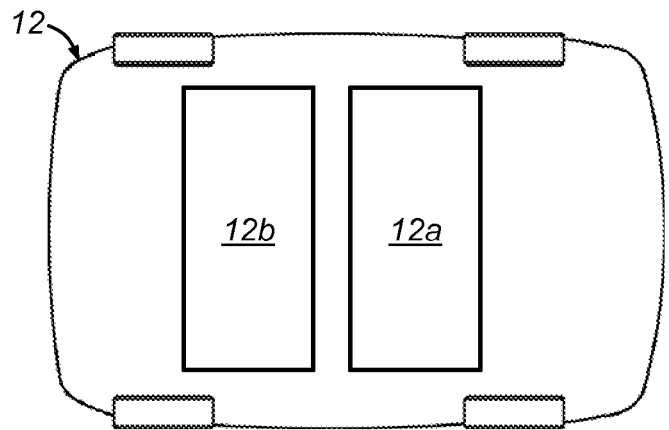
FIGS. 4-6 show other exemplary arrangements of listening zones in vehicles.
Figure 5:
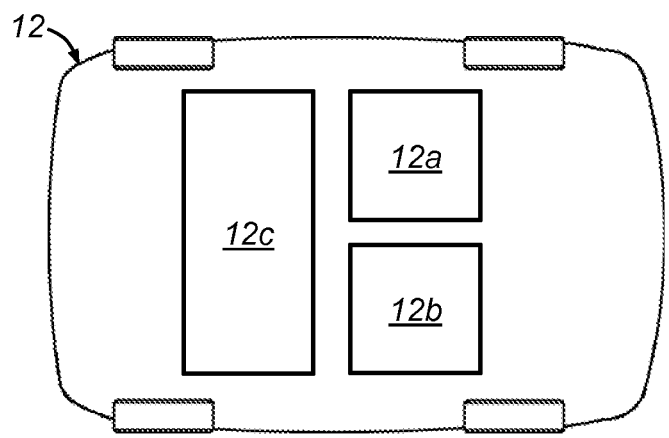
Figure 6:
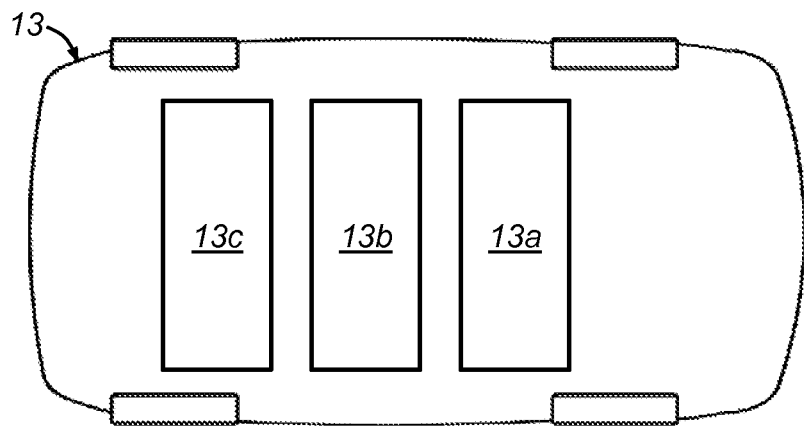

Even though FIG. 3 shows one microphone 32a-32d per corresponding zone 12a-12d, skilled artisans will appreciate that other embodiments are also possible. For example, in one embodiment, multiple microphones per zone may be employed. In another embodiment, one microphone per row (e.g., one microphone in front row, one microphone in rear row, etc.) may be employed, see FIG. 4, such that the vehicle may have only two listening zones 12a and 12b. Or, for example, listening zones may correspond to individual passenger seat locations (e.g., driver, front passenger, and left, center, and right rear passenger zones). In another example, a listening zone may include whole vehicle interior listening zone covering all passenger seats, such as indicated by the pickup pattern 31 in FIG. 2. This may be covered by multiple microphones together or by a single microphone such as the directionally controllable microphone 32 discussed above in connection with FIG. 2. FIG. 5 shows another listening zone layout wherein separate zones are defined for each front seat position, but only a single rear zone is used covering all seats in the second row. FIG. 6 shows a different vehicle 13 having a three row passenger compartment, each row of which is handled as a single zone 13a-13c. Other such configurations of zones and one or more microphones will become apparent to those skilled in the art.

Method—

Figure 7:
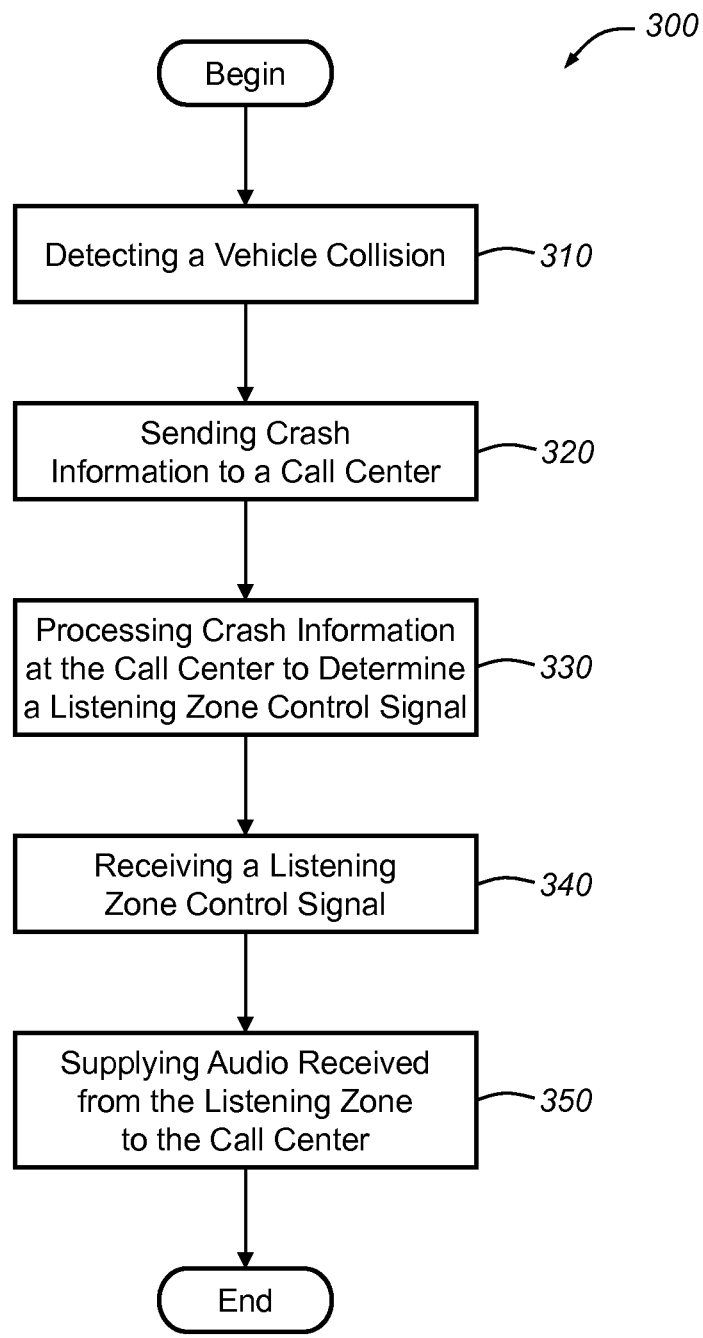
FIG. 7 is a flowchart illustrating an embodiment of a method for providing call center emergency services using the microphone systems of either FIG. 1 or FIG. 3.

Turning now to FIG. 7, there is shown one of a number of different methods that may utilize the microphone systems 110, 210 described above to permit advisor or other call center-based selection and control of monitored listening zones within the vehicle. In the method 300 of FIG. 7, call center emergency services may be provided to one or more occupants of a vehicle in response to a detected collision, such as may be done using a crash detection vehicle system module (VSM). The method starts at step 310 and begins by detecting a vehicle collision. Skilled artisans should appreciate that a vehicle crash can be detected in a variety of ways including deployment of one or more airbags, sensing from a collision sensor (e.g., crash sensor, etc), etc. In one embodiment, telematics unit 30 receives from VSM 42 such as a vehicle crash module, a safety module, a vehicle communication module, an advanced automatic collision notification module, and/or any other suitable module a notification via communication bus 44 about a vehicle crash. In another embodiment, a vehicle occupant associated with telematics services sends a manual alert by, for example, pushing a physical button (e.g., pushbutton 34) in the vehicle that is used in conjunction with telematics services delivered via the telematics unit alerting call center 20 about a vehicle crash.

Regardless of whether the collision detection is supplied automatically or via manual input, then at step 320 method 300 sends crash information to a call center. Vehicle 12 may send one or more wireless communications about the vehicle crash to the call center. In one embodiment, vehicle 12 sends an alert notification in one communication message, followed by one or more communication messages that include additional information about the vehicle crash. In another embodiment, vehicle 12 sends one communication message that includes a notification message and additional information about the vehicle crash via telematics unit 30 to call center 20. The information received may comprise data related to the crash and the vehicle including at least one of the following: occupant position within the vehicle, number of occupants, or both, retrieved data from a speech listening system 210 stored at system 210 and/or other location, condition of the speech listening system 210, and/or any other related data. The crash information may be sent via a wireless communication established, in one embodiment, automatically between the telematics unit 30 and call center 20 upon detection of the vehicle crash. In another embodiment, the crash information may be sent via a wireless communication initiated manually between the telematics unit 30 and call center 20 by an occupant of vehicle 12.

At step 330, method 300 processes the crash information received at a call center. Method 300 may determine an occupant position at pre-crash or post-crash. In one embodiment, call center 20 receives indication of which of a number of listening zones 12a-12d were determined by the vehicle 12 (e.g., speech listening system controller 33) to have occupants based on prior speech pickup (e.g., during normal driving) from one or more of the listening zones 12a-12d (e.g., based on relative volume of the same speech entering different microphones). In another embodiment, a live advisor 86 or an application running at call center 20 processes the information previously received from vehicle 12 to determine which listening zones 12a-12d have occupants based on prior speech pickup from one or more of the listening zones 12a-12d. Skilled artisans should appreciate that other techniques may be used to determine one or more occupants positions including usage of seat sensor, seatbelt sensor, vision sensor, etc. Once, an occupant position is determined, a listening zone control signal may be sent by the advisor to monitor one or more particular zones. For example, the microphone control system 110, 210 may sequence through the different zones so that the advisor may hear what sound is coming from each zone. This may be an automated sequencing or done under the control of the advisor. This may also include prompting from the advisor to seek a response from the occupant(s). Thus, for example, if only a driver D is determined to be occupying the vehicle 12, then listening zone 12a may be targeted (monitored) exclusively or, if no response, the other zones may be checked to determine if, for example, the driver's position within the passenger compartment has changed as a result of the crash. In another scenario, the driver D and a passenger P1 are determined to be occupying the vehicle 12, and then listening zones 12a and 12b may be targeted, either together or one at a time. In yet another scenario, the driver D and several passengers P1-P3 are determined to be occupying the vehicle 12 then listening zones 12a-12d may be targeted.

At step 340, vehicle 12 receives a listening zone control signal that causes the vehicle to connect a microphone for a listening zone to a voice call with the call center. In one embodiment, call center 20 sends a listening zone control signal to telematics unit 30 of vehicle 12. Then, telematics unit 30 either activates monitoring of the particular zone identified by the control signal (as in system 110 of FIG. 1), or passes the control signal to controller 33 in order to control one or more microphones 32a-32d (as in system 210 of FIG. 3). At step 340, method 300 may send one control signal to monitor one specific microphone (e.g., driver's microphone), cycle through each listening zone to detect possible occupant presence via sending a second, a third, and/or other control signals, and/or send control signals to all listening zones to listen to the entire passenger compartment of the vehicle.

At step 350, method 300 supplies audio received from a listening zone to the call center. In one embodiment, call center 20 receives audio over a voice call from at least one microphone (e.g., driver's microphone, passenger's microphone, etc.) in the vehicle that is configured to pickup sound from a passenger compartment listening zone identified by the control signal sent in step 340. The voice call may be established between vehicle 12 and call center 20 via telematics unit 30 as it is well known in the art. At this step, in one embodiment, a live advisor 86 may receive audio from one listening zone, cycle through receiving audio from different listening zones, and/or receive audio from multiple zones simultaneously. In doing so, the live advisor may assess the condition of occupants in the vehicle to determine occupant responsiveness and other crash conditions, provide emergency services, and customer reassurance. That is, the advisor may assess the condition of occupants in the vehicle by switching between two or more listening zones using control signals sent from the call center and analyzing audio from the two or more listening zones. Furthermore, the live advisor may communicate crash information (e.g., number of occupants and/or occupant condition) to emergency personnel (PSAP, first responders en route, etc.). The advisor may also place a call to an emergency authority while a voice call with the vehicle and the call center is still active and connect the two calls together so that the occupant(s) can speak with the emergency personnel directly.

As will be appreciated from the above-described method, different processes are carried out at the vehicle and call center that together enable the method 300. For example, at the call center the method involves: (a) receiving a communication at the call center from a vehicle indicating emergency services may be needed by one or more occupants of the vehicle; (b) sending a listening zone control signal to the vehicle; and (c) monitoring at the call center for audio received over a voice call from at least one microphone in the vehicle that is configured to pickup sound from a passenger compartment listening zone identified by the control signal. Similarly, the process at the vehicle involves: (a) detecting a potential emergency condition; (b) sending an emergency notification to a call center; (c) receiving a listening zone control signal identifying at least one of a plurality of listening zones in the vehicle; and (d) supplying audio received from the identified listening zone(s) to the call center via a voice call between the vehicle and call center.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the microphone systems 110, 210 discussed above may be used for methods other than that discussed above to provide different vehicle services that involves monitoring of different listening zones within the vehicle. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for providing call center emergency services to one or more occupants of a vehicle having a plurality of listening zones within a passenger compartment of the vehicle, comprising the steps of:
   (a) receiving a communication at a call center from a vehicle indicating emergency services may be needed by one or more occupants of the vehicle and determining occupant position information indicating a location of one or more occupants within the vehicle, wherein the occupant position information is based on one or more of the following: speech pickup from one or more microphones within a vehicle passenger compartment, a seatbelt sensor, a seat sensor, or a vision sensor;

(b) in response to step (a), sending a listening zone control signal to the vehicle from the call center via cellular transmission, wherein the call center remotely controls the one or more microphones within the vehicle passenger compartment via the control signal, wherein during step (b) the call center's remote control of the one or more microphones does not require human actuation of the one or more microphones, wherein remote control of the one or more microphones isolates passenger compartment audio coming from at least one of the plurality of listening zones; and (c) monitoring the passenger compartment audio associated with the at least one of the plurality of listening zones at the call center over a voice call.

2. The method of claim 1, wherein step (a) further comprises receiving a crash detection notification from the vehicle.

3. The method of claim 1, wherein the occupant position information is determined prior to the need for emergency services, the occupant position information is determined following the need for emergency services, or both.

4. The method of claim 1, wherein step (b) further comprises determining the listening zone control signal based on the occupant position information.

5. The method of claim 1, wherein steps (b) and (c) are carried out by an advisor at the call center.

6. The method of claim 1, further comprising the step of sending a second listening zone control signal to switch to monitoring of a different listening zone in the vehicle.

7. The method of claim 1, further comprising the step of assessing the condition of occupants in the vehicle by switching between two or more listening zones using control signals sent from the call center and analyzing audio from the two or more listening zones.

8. The method of claim 7, wherein the assessing step is carried out by a live advisor at the call center.

9. A method for providing call center emergency services to one or more occupants of a vehicle having a plurality of listening zones within a passenger compartment of the vehicle, comprising the steps of:

(a) monitoring the passenger compartment for occupant position information involving the vehicle, wherein the monitoring step includes receiving speech pickup from one or more microphones associated with the plurality of listening zones and storing occupant position information based on the received speech pickup; then, (b) detecting a potential emergency condition, wherein the emergency condition includes a collision event involving the vehicle;

(c) sending an emergency notification of the collision event to a call center;

(d) in response to step (c), receiving a listening zone control signal at a telematics unit in the vehicle and from the call center identifying at least one of the plurality of listening zones in the vehicle based at least in part on the occupant position information; and (e) supplying audio received from the at least one identified listening zone to the call center via a voice call between the vehicle telematics unit and the call center.

10. The method of claim 9, wherein step (b) further comprises detecting the collision event automatically using a collision sensor or receiving an occupant manual request for emergency services.

11. The method of claim 9, wherein step (c) includes sending occupant related data indicating occupant position, number of occupants, or both.

12. The method of claim 9, wherein step (d) further comprises passing the control signal to a microphone system in the vehicle that includes the one or more microphones.

13. The method of claim 12, wherein step (e) further comprises supplying to the telematics unit audio received from the one or more microphones identified by the control signal.

14. A vehicle having vehicle electronics that includes a plurality of vehicle system modules each having a processor and memory storing a non-transitory, computer program product executable by the respective processors, wherein the respective computer program products contain instructions such that the modules together operate in response to execution of the instructions by the processors to carry out the following steps:

(a) monitoring a passenger compartment for occupant position information involving the vehicle, wherein the monitoring step includes receiving speech pickup from one or more microphones associated with a plurality of listening zones and storing occupant position information based on the received speech pickup; then, (b) detecting a vehicle collision using a crash detection module in the vehicle;

(c) sending a crash notification to a call center via a telematics unit in the vehicle in response to step (b);

(d) receiving from the call center via the telematics unit a listening zone control signal identifying at least one of the plurality of listening zones in the vehicle based at least in part on the occupant position information; and (e) in response to step (d), supplying audio received from the identified listening zone(s) to the call center via a voice call between the telematics unit and the call center, wherein during step (e) supplying the audio to the call center does not require human actuation.

* * * * *